United States Patent
Villeret et al.

(10) Patent No.: US 10,859,180 B2
(45) Date of Patent: Dec. 8, 2020

(54) MULTI-POSITION ROTARY ACTUATOR CONTROLLED BY A FLUID

(71) Applicant: OUT AND OUT CHEMISTRY SPRL, Gilly (BE)

(72) Inventors: Guillaume Villeret, Dimont (FR); Vincent Tadino, Chastrès (BE); Marc Lorent, Givet (FR); Adrien Orleans, Mons (BE)

(73) Assignee: OUT AND OUT CHEMISTRY SPRL, Gilly (BE)

( * ) Notice: Subject to any disclaimer, the term of this patent is extended or adjusted under 35 U.S.C. 154(b) by 117 days.

(21) Appl. No.: 16/060,448

(22) PCT Filed: Nov. 30, 2016

(86) PCT No.: PCT/EP2016/079204
§ 371 (c)(1),
(2) Date: Jun. 8, 2018

(87) PCT Pub. No.: WO2017/097648
PCT Pub. Date: Jun. 15, 2017

(65) Prior Publication Data
US 2018/0355999 A1    Dec. 13, 2018

(30) Foreign Application Priority Data

Dec. 11, 2015   (BE) .................... 2015/5817

(51) Int. Cl.
*F16K 31/163* (2006.01)
*F16K 31/122* (2006.01)
(Continued)

(52) U.S. Cl.
CPC .......... *F16K 31/1635* (2013.01); *F15B 15/06* (2013.01); *F15B 15/068* (2013.01);
(Continued)

(58) Field of Classification Search
CPC ...... F15B 15/06; F15B 15/068; F16H 25/186; F16K 31/1635; F16K 31/1225
(Continued)

(56) References Cited

U.S. PATENT DOCUMENTS 162,528 A * 4/1875 Burleigh .................. B25D 9/16
                                                                91/343
3,169,407 A * 2/1965 Newell ............... F16H 25/2204
                                                              74/424.9
(Continued)

FOREIGN PATENT DOCUMENTS

DE    3925887 A1    2/1991
DE    4400743 A1 *  7/1995   ............ F15B 11/125
(Continued)

OTHER PUBLICATIONS

European Patent Office search report dated Jan. 31, 2017 re PCT Application No. PCT/EP2016/079204 of Out and Out Chemistry SPRL.

*Primary Examiner* — Angelisa L. Hicks
(74) *Attorney, Agent, or Firm* — Daugherty & Del Zoppo Co. LPA; Patrick Daugherty (57) ABSTRACT

Actuators and devices are provided for imparting a rotary movement and comprising in a longitudinal direction first and second hydraulic cylinders, characterised in that the first driver is a linear hydraulic cylinder comprising a first piston, and that the second driver is a linear hydraulic cylinder comprising a second piston, and in that the devices include a member for converting linear motion into rotary motion in order to convert a translation movement of the second piston into a rotary movement.

9 Claims, 6 Drawing Sheets

(51) Int. Cl.
*F15B 15/06* (2006.01)
*F15B 15/14* (2006.01)
*F16H 25/18* (2006.01)

(52) U.S. Cl.
CPC ....... *F15B 15/1409* (2013.01); *F16H 25/186* (2013.01); *F16K 31/1225* (2013.01)

(58) Field of Classification Search
USPC ........................................................ 251/252
See application file for complete search history.

(56) References Cited

U.S. PATENT DOCUMENTS

| | | | | |
|---|---|---|---|---|
| 3,508,472 | A * | 4/1970 | Hartwick, Jr. ......... | F15B 15/24 92/13 |
| 3,916,701 | A * | 11/1975 | Butler ..................... | B25J 9/045 74/57 |
| 4,089,229 | A * | 5/1978 | Geraci .................. | F15B 15/068 74/57 |
| 5,558,005 | A * | 9/1996 | Heckner .............. | B23Q 16/004 91/167 R |
| 2001/0029835 | A1 | 10/2001 | Takeuchi et al. | |
| 2005/0126963 | A1* | 6/2005 | Phagoo ................ | B01D 61/142 210/110 |
| 2005/0218359 | A1* | 10/2005 | Davis .................... | F16K 31/363 251/29 |
| 2014/0245881 | A1* | 9/2014 | Hamed ............... | F15B 11/0365 91/189 R |

FOREIGN PATENT DOCUMENTS

| | | |
|---|---|---|
| DE | 19828465 A1 | 1/2000 |
| EP | 0077596 A1 | 4/1983 |
| WO | WO8403128 A1 | 8/1984 |
| WO | WO2013127439 A1 | 9/2013 |

* cited by examiner

MULTI-POSITION ROTARY ACTUATOR CONTROLLED BY A FLUID

TECHNICAL FIELD

The invention relates to a device for imparting a rotary movement, more preferably with several angular stop positions defined. Such a device can be for example used to control one or several valves. The inventors also propose a system for controlling the passage of a fluid in a duct and a machine for synthesising or purifying elements comprising the control device of the invention.

PRIOR ART

Devices for imparting a rotary movement are known, used for example for controlling valves.

WO2013/127439 A1 describes for example a compressed air device for controlling valves. This device comprises a first and a second rotary hydraulic cylinders with vanes connected together by mutual interlocking. These two rotary hydraulic cylinders are generally supplied with compressed air as a control fluid. The use of the two rotary hydraulic cylinders of this device makes it possible to impose three positions of a valve to be controlled, for example three different orientations marked by angles 0°, 90° and 180°.

The device described in WO2013/127439 A1 has certain disadvantages. The leakage rate in compressed air is not negligible and for certain applications, it is not acceptable. On the other hand, its various elements are relatively difficult to manufacture and the overall device is relatively complicated to implement.

US 2001/0029835 A1 describes for example a compressed air device that makes it possible to impose three positions on an axis by converting a movement generated by linear hydraulic cylinders into a rotary movement.

The device described in US 2001/0029835 A1 has certain disadvantages. The complex architecture that in particular the interlocking has of a hydraulic cylinder and of an element for converting linear motion into rotary motion appears difficult to implement due to the problem with the seal on the system for converting linear motion into rotary motion.

SUMMARY OF THE INVENTION

According to a first aspect, one of the purposes of this invention is to provide a device for imparting a rotary movement that is easy to manufacture and implement. To this effect, the inventors propose a device for imparting a rotary movement about a longitudinal direction for the valve control and comprising along said longitudinal direction:
 a first linear hydraulic cylinder comprising a first casing and a first piston able to provide a translation movement along said longitudinal direction in said first casing, said first hydraulic cylinder being able to be supplied by a control fluid;
 a second linear hydraulic cylinder comprising a second casing a second piston able to provide a translation movement along said longitudinal direction in said second casing, said second hydraulic cylinder being able to be supplied by a control fluid;
 a member for converting linear motion into rotary motion in order to convert a translation movement of the second piston along said longitudinal direction into a rotary movement about said longitudinal direction;
said first and second hydraulic cylinders being configured in such a way that the first hydraulic cylinder is able to influence the second hydraulic cylinder; characterised in that:
 said first piston comprises a first plate able to determine a first and a second chamber in said first casing;
 said first hydraulic cylinder comprises a first and a second ports in order to respectively supply said first and second chambers with said control fluid and impose a translation movement of said first piston thanks to a difference in pressure between said first and second chambers;
in that:
 said second piston comprises a second plate able to delimit a third and a fourth chamber in said second casing;
 said second hydraulic cylinder comprises a third and a fourth ports in order to respectively supply said third and fourth chambers with said control fluid and impose a translation movement of said second piston thanks to a difference in pressure between said third and fourth chambers;
and in that:
 said member for converting comprises a rotating element separate from the second piston in order to convert a translation movement of the second piston into a rotary movement, said rotating element being located outside of the first and second casings.

The longitudinal direction can be for example defined as a direction along which or parallel to which the first and second pistons can be displaced.

The first and second hydraulic cylinders of the device of the invention are linear. The latter have a degree of a seal that is higher than that of rotary hydraulic cylinders with vanes that use a control fluid. In the end, the device of the invention has less leakage of control fluid. As linear hydraulic cylinders have a better seal than rotating hydraulic cylinders, it is not necessary to provide additional sealing shells with the device of the invention, or to use highly elaborated sealing parts. With the device of the invention, it is indeed possible to have good sealing performance by using simple sealing elements, such as O-rings, which are available of the shelf and are inexpensive. The manufacture of the device of the invention also requires fewer precautions when assembling the various elements for the same degree of sealing. Furthermore, it is easier to manufacture linear hydraulic cylinders than rotating hydraulic cylinders. In particular, it is simpler to manufacture linear hydraulic cylinders oneself than rotating hydraulic cylinders. It is there possible to avoid purchasing commercial hydraulic cylinders with the device of the invention and no longer be dependent on suppliers. These different reasons make it possible to have a control device that is simple to manufacture and to implement with respect to the device described in WO2013/127439 A1.

The device of the invention has other advantages. As it is easier to manufacture and as it requires less parts dedicated to obtaining high levels of a seal, the device of the invention is less expensive. It also makes it possible to work with lower pressures for the control fluid. By way of example, the inventors have found that with 4.5 bar of pressure, it is possible with the device of the invention to have an output torque equivalent to the device of WO2013/127439 A1 used with 6 bar; which is about a 25% reduction for the same space occupied. This aspect also facilitates the design of the device of the invention. There is no need for elaborate control logic for controlling the device of the invention. Each hydraulic cylinder can have only two configurations or two operating states. These two configurations can be referred to as 'input rod/output rod' or 'IN/OUT'. The control device of the invention makes it possible to impose rotations in both directions and not only in a single direction. Thanks to this aspect, the device of the invention can be used in many applications. The device of the invention takes up little space. It can be used for controlling valves in corrosive, radioactive, wet, compact environments. It is also not necessary to provide electromagnetic shielding in order to protect electronic elements such as sensors for example.

The device of the invention claimed has other advantages in relation to document US 2001/0029835 A1 in which the device requires the interlocking of the system for converting linear motion into rotary motion with a piston in the same casing as well as the supply with fluid of a chamber of a piston through a second chamber. The device of the invention claimed requires four dynamic seals while the device of US 2001/0029835 A1 requires six dynamic seals. Reducing the number of dynamic seals makes the device more reliable in terms of a seal and simpler in terms of the manufacture thereof and of the assembly thereof.

The device of the invention claimed does not require any complex architecture such as described by document US 2001/0029835 A1 and is compatible with the use of commercial hydraulic cylinders for which the adding of a system for converting linear motion into rotary motion does not require modification of the linear hydraulic cylinders.

The device of the invention claimed has four chambers provided with a fluid pressure control in order to be able to actuate the pistons of the hydraulic cylinders independently of one another. The four chambers of the device of the invention are all different and separate from one another and supplied independently by the control fluid. This has a certain advantage with respect to document US 2001/0029835 A1 which has only three chambers allowing for the control of two pistons. It as such appears that the two pistons cannot be controlled independently for all of the rotation movements of the output shaft. An independent control of the drives is particularly sought for the valve control in order to have hydraulic cylinder movements that are well controlled for a conversion into a rotary movement of which the angular rotation speeds are substantial.

The device of the invention could be called an activator or actuator for one or several valves. Preferably, the device of the invention therefore comprises, along a longitudinal direction, the following elements in the following order: the first hydraulic cylinder, the second hydraulic cylinder and the member for converting. A member can as such be obtained for converting and therefore a device according to the invention that is particularly simple and compact. The rotating element included in the member for converting is separate from the first piston.

According to a possible embodiment, the member for converting comprises a third casing. The rotating element is located in the third casing. The member for converting comprises a third casing which is different from the first and second casings.

Preferably, this rotating element comprises at least one hollow portion. It is then possible to provide a particularly simple cooperation between the member for converting and the second hydraulic cylinder, with the latter able for example to have at least one portion which can be inserted into said at least one hollow portion of the rotating element. Preferably, said rotating element comprises over at least one portion of its external surface a groove. By using a shape of said groove which is not a straight line parallel to the longitudinal direction, it is then possible to obtain a member for converting that is simple and easy to implement. The rotating element can comprise more than one groove over at least one portion of its external surface. Preferably, it comprises two grooves. Preferably, the groove or grooves have a helical shape along said portion of the external surface of the rotating element, around the longitudinal direction of the device of the invention.

Preferably, the device of the invention comprises on the second piston a pin extending in a direction that is substantially perpendicular to said longitudinal direction and able to be inserted into the groove or grooves of said rotating element when the latter comprises them, in order to mechanically couple said second piston to said rotating element. The pin can be an integral part of the second piston, with the latter then comprising such a pin. When the pin is not an integral part of the second piston, it is mechanically coupled to it and more preferably fixed. For example, the pin can be comprised of a cylindrical lug.

The device of the invention can further comprise a rotating connecting element to interlock on said at least one valve to be controlled, said connecting element being mechanically coupled to an element of said member for converting. For example, the connecting element can be connected to the rotating element of the member for converting when the latter comprises such an element.

Preferably, the device of the invention is able to impose on an output shaft at least three different angular positions separated by 90° from one another.

In general, the second hydraulic cylinder has a stroke that is twice as large as said first hydraulic cylinder.

Preferably, said first plate has a surface (or area) greater than said second plate. In other terms, the area of the first plate is greater than the area of the second plate for this preferred embodiment. The first piston can then have for example and preferably a force twice as substantial than the second piston, for the same pressure of control fluid. Preferably, the area of the first plate is two times greater than the area of the second plate.

The device of the invention can comprise a third linear hydraulic cylinder coupled to at least one of the first and second hydraulic cylinders in such a way that a configuration of said third hydraulic cylinder is able to influence a configuration of at least one of the first and second hydraulic cylinders. It is then possible to have a device for controlling valve(s) able to impose more than three different orientations to said valve or valves. And this, particularly simply. The device of the invention can comprise more than three linear hydraulic cylinders. It is then possible to obtain additional orientations of a valve or valves to be controlled. For example, the device of the invention can comprise four, five, six, seven, eight, nine, ten linear hydraulic cylinders. Preferably, the device according to the invention is able to impose on an output shaft at least four different angular positions separated by 90° from one another.

In general, the first and second hydraulic cylinders comprise at least one (two in general) ports in order to supply them with a control fluid. Examples of control fluid are: compressed air, inert gas, oil or any other fluid.

The inventors also propose a system for controlling a passage of a fluid in a duct and comprising:
    at least one valve for controlling said passage of said fluid in said duct;
    at least one device such as described hereinabove, each one of said at least one device being coupled to each one of said at least one valve in order to control it.
The various preferred embodiments of the device of the invention can be used in this system. The advantages of the device and of its various embodiments also apply to this system. In particular, it is possible to have a system that has a high level of a seal and which is simple to implement.

The inventors have also designed a machine for synthesising or purifying elements comprising:
- a system such as described hereinabove,
- a control unit to control the device of this system and which has also been described hereinabove,
- the duct in which the passage of a fluid is controlled, in such a way that at least one valve of the system is located in said duct.

The various preferred embodiments of the device and of the system of the invention can be used in this machine for the synthesis or purification of elements. The advantages of the device and of the system of the invention, as well as those of the various embodiments of this device and of this system apply also to this machine. In particular, it is possible to have a machine that has a high level of a seal and that is simple to implement.

Preferably, said duct is a duct with a single use cassette.

BRIEF DESCRIPTION OF THE FIGURES

These aspects as well as other aspects of the invention shall be clarified in the detailed description of particular embodiments of the invention, with reference being made to the drawings of the figures, wherein.

The drawings of the figures are not to scale. Generally, similar elements are denoted by similar references in the figures. The presence of reference numbers in the drawings cannot be considered as limiting, including when these number are indicated in the claims.

DETAILED DESCRIPTION OF CERTAIN EMBODIMENTS OF THE INVENTION

Figure 1:
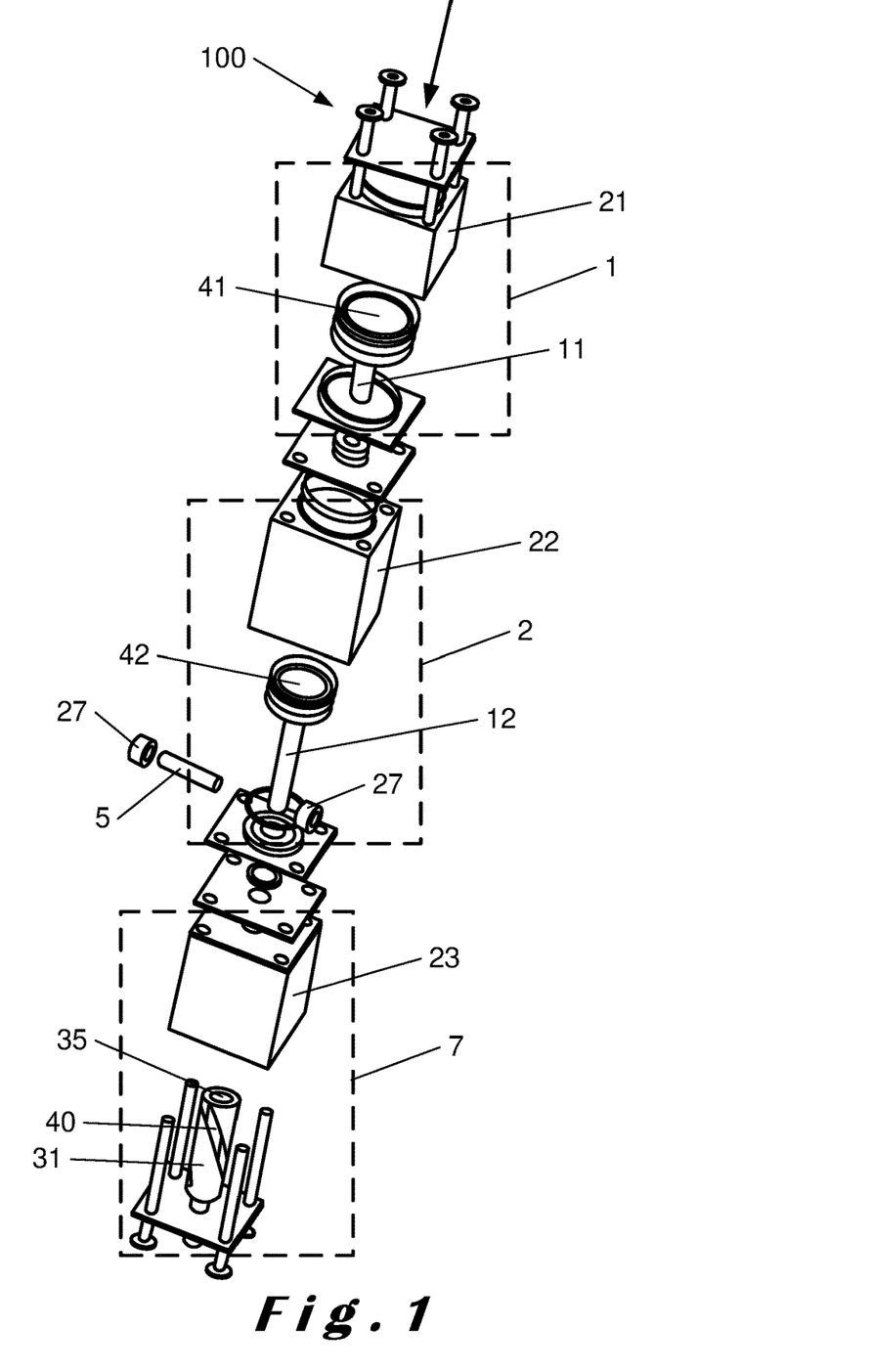
FIG. 1 shows a view of an embodiment of a device according to the invention.
Figure 2:
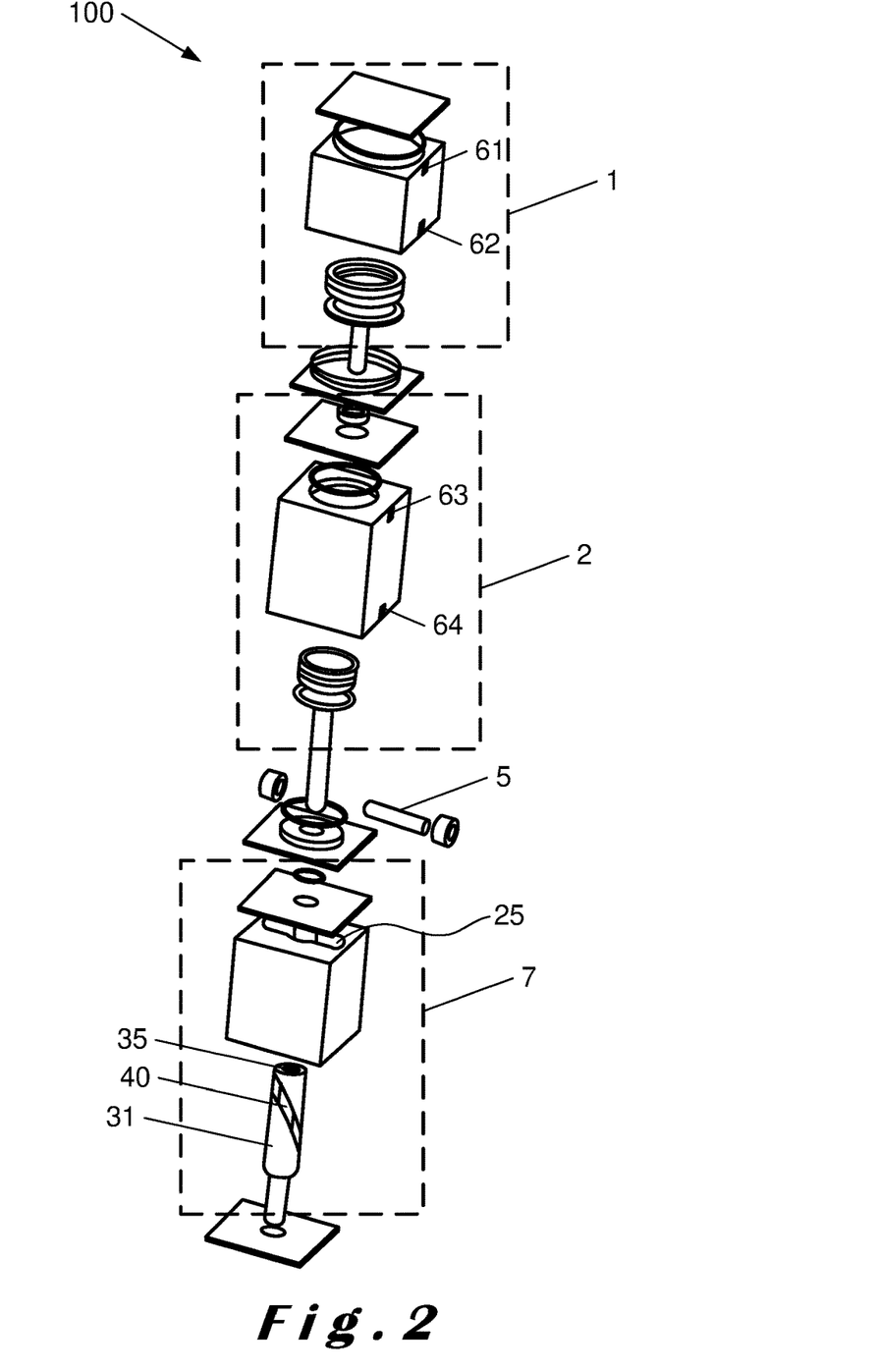
FIG. 2 shows another view of the embodiment of the device represented in FIG. 1 according to the invention.
Figure 3:
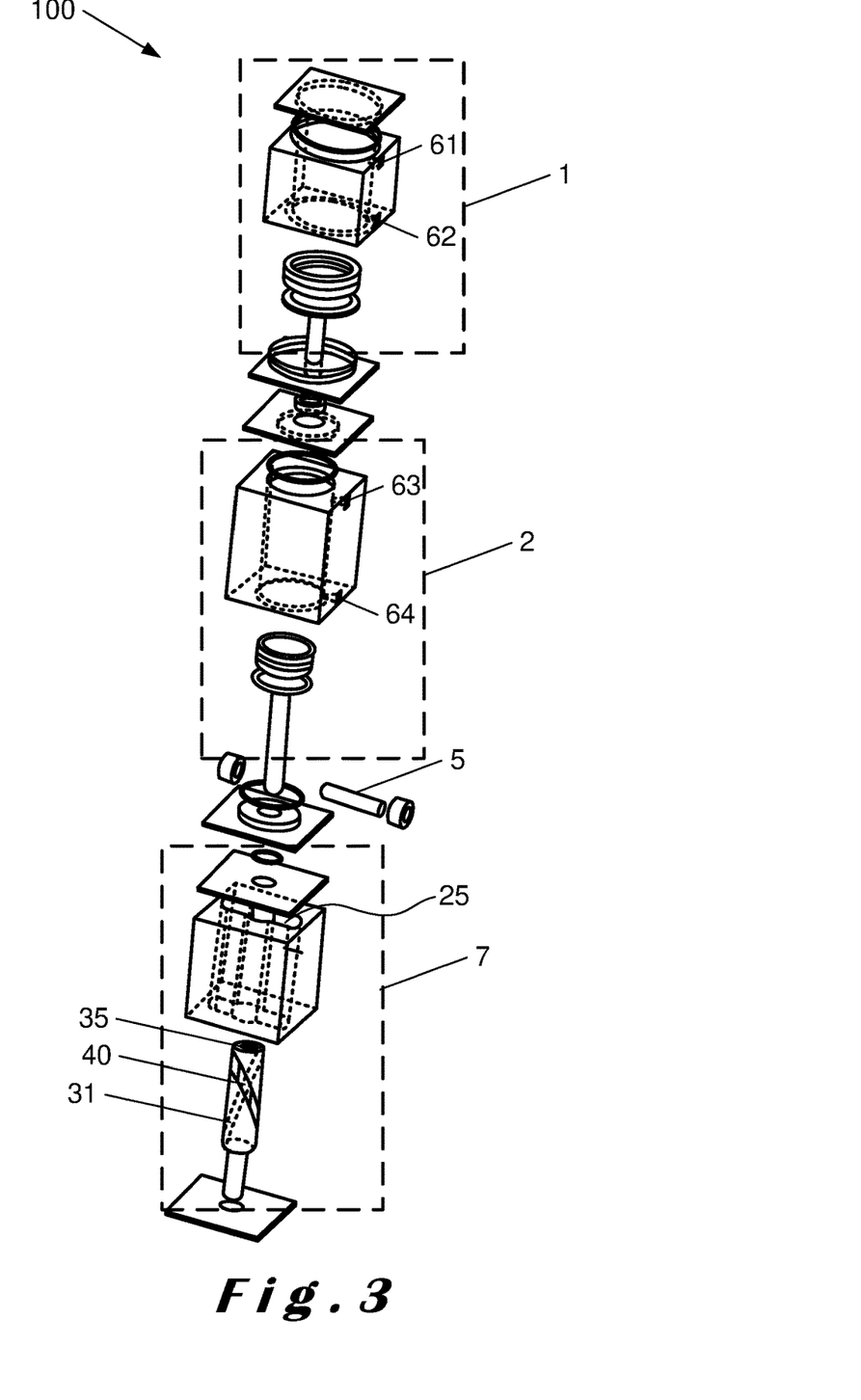
FIG. 3 shows another view of the embodiment of the device represented in FIG. 1 and in FIG. 2 according to the invention.

FIGS. 1 to 3 show different views of an example of the device 100 according to the invention. Along a longitudinal direction, symbolised by an arrow in FIG. 1, the device 100 comprise a first 1 and a second 2 hydraulic cylinder. These two hydraulic cylinders (1, 2) are coupled in such a way that a configuration (or operating state) of the first hydraulic cylinder 1 can influence a configuration (or operating state) of the second hydraulic cylinder 2. It can also be said that the first and second hydraulic cylinders (1, 2) are coupled in such a way that the first 1 is able to influence the second 2 and more particularly an operating state of the second hydraulic cylinder 2. For example, the first and second hydraulic cylinders (1, 2) can be mechanically coupled. This shall be seen more clearly during the description of the operation of the device 100 of the invention which will be done with FIG. 5.

The first 1 (respectively second 2) hydraulic cylinder is a linear hydraulic cylinder comprising a first 11 (respectively second 12) piston. The first and second pistons (11, 12) can be controlled by the intermediary of a control fluid. Examples of a control fluid are: compressed air, inert gas, oil or any other fluid. Examples of linear hydraulic cylinders are known to those skilled in the art. In general, the first 1 (respectively second 2) hydraulic cylinder comprises a first 21 (respectively second 22) casing in which the first 11 (respectively second 12) piston can slide.

The device of the invention 100 also comprises a member (or element) for converting 7 linear motion into rotary motion in order to convert a translation movement of the second piston 12 into a rotary movement. As such, when the second piston 12 describes a linear movement, the member for converting 7 makes it possible to transform this movement in such a way that an element connected to it provides a rotation movement. In general, the member for converting 7 comprises a third casing 23.

The member for converting 7 comprises more preferably a rotating element 31 in order to convert a translation movement of the second piston 12 into a rotary movement. This preferred embodiment is shown in FIG. 1. A rotating element is an element which can provide a rotation movement. Preferably, the rotating element 31 is housed in the third casing 23.

As can be seen in FIGS. 1 to 3, the rotating element 31 comprises more preferably a hollow portion. In the preferred embodiment shown in this figure, the second piston 12 can penetrate in the hollow 35 of this hollow portion of the rotating element 31. The rotating element 31 is more preferably fixed in translation.

As can also be seen in FIGS. 1 to 3, the rotating element 31 preferably comprises one or several grooves 40 over at least one portion of its external surface. In the preferred embodiment of FIG. 1, the rotating element 31 comprises two grooves 40. Preferably, this or these grooves 40 are helical along the longitudinal direction. In the example of FIGS. 1 to 3, the rotating element 31 has a symmetry of revolution around an axis of symmetry and the two grooves 40 of said rotating element 31 describe a helix about this axis of symmetry. In the example of FIGS. 1 to 3 wherein the first hydraulic cylinder 1, second hydraulic cylinder 2 and member for converting 7 are aligned, the axis of symmetry of the rotating element 31 coincides with the longitudinal direction (arrow of FIG. 1).

As can be seen in FIGS. 1 to 3, the device 100 of the invention preferably comprises a pin 5 on the second piston 12. The pin 5 could also be called mechanical part or mechanical element. Preferably, this pin 5 is mechanically coupled, for example fixed, to the second piston 12. In order to couple the pin 5 to the second piston 12, it is possible for example to pierce the latter 12 with a hole, insert the pin 5 through, then block it with mechanical tightening for example (or by screwing or gluing the pin 5 on the second piston 12). Note that the blocking of the pin 5 on the second piston 12 is not necessary. The pin 5 can be mounted with a certain clearance in a hole of the second piston 12; the pin 5 is then maintained in position for example by the intermediary of walls of grooves made in the third casing 23. The pin 5 extends in a direction that is substantially perpendicular to said longitudinal direction and is able to be inserted into the two grooves 40 of the rotating element 31, in order to mechanically couple the second piston 12 to said rotating element 31. Indeed, the second piston 12 can penetrate the hollow of the hollow portion of the rotating element 31 and the pin 5 makes it possible to mechanically couple the second piston 12 to the rotating element 31 in the following way. When the second piston 12 is in the hollow of the rotating element 31 and carried out a translation movement with respect to it, the pin 5, of which two ends are housed in the helical grooves 40 of the rotating element 31, also provide a translation movement imposes on the rotating element 31 to rotate.

Internal grooves 25 (preferably linear) can be provided inside the third casing 23 in order to allow the pin 5 to slide along the latter when it provides a translation movement with respect to the third casing 23. Preferably, the pin 5 is then provided with ball bearings 27 at its ends in order to enable it to be displaced more easily inside the third casing 23. Such bearings 27 are shown in FIG. 1. The ball bearings 27 can for example be replaced with sliding rings. The ball bearings 27 or sliding rings are not indispensable. The pin 5 which can have the shape of a pin can slide directly, without bearings 27, in one or several grooves 25 of the third casing 23. Grooves 25 in the third casing 23 make it possible to prevent the rotation of the pin 5 during the translation thereof. Other solutions could be used such as for example blocking the rotation of the second piston 12 with the use of a hexagonal rod, of a square rod, of a triangular rod or with a non-circular plate. According to another possible alternative, it is possible to provide a straight groove 40 in the rotating element 31 and a helical groove 25 in the third casing 23.

Other forms of the pin 5 than that shown in FIGS. 1 to 3 could be considered to couple the second piston 12 to the rotating element 31. Likewise, other means of coupling between the second hydraulic cylinder 2 and the member for converting 7 could be considered.

Preferably, the device 100 of the invention comprises sealing parts such as seal (O-rings or Quad-ring for example) in order to provide the seal between the various elements. As is shown in FIG. 1, the device 100 of the invention can also include one or several spacer parts extending substantially perpendicularly to the longitudinal direction.

Figure 4:
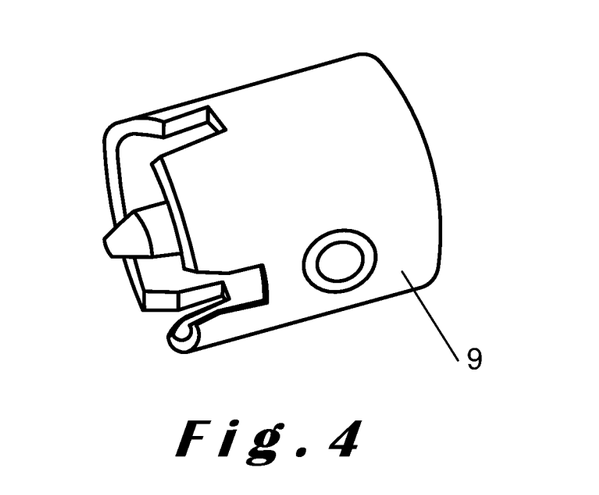
FIG. 4 shows an example of a connecting element to be fitted onto a valve to be controlled.

Preferably, the device 100 of the invention comprises a rotating connecting element 9 able to fit onto the valve 200 to be controlled. An example of a connecting element 9 is shown in FIG. 4. This connecting element 9 is then mechanically coupled to the member for converting 7. For example, the connecting element 9 is connected to the rotating element 31. Taking the example of FIG. 4, the straight portion of the connecting element 9 is then connected to the rotating element 31, of which its left portion is intended to be coupled to a valve 200 to be controlled for example. Preferably, the left portion of the connecting element 9 is able to cooperate with a tap in the shape of a T, with the branches of the T being housed in notches that can be seen on the left portion of the connecting element 9 of FIG. 4.

Along the longitudinal direction, the device 100 of the invention has for example a size between 4 and 10 cm. Other sizes are however possible. As such, it is possible to have a device 100 of several tens of centimetres. The first 21, second 22 and third 23 casings for example each have a size between 5 cm$^3$ and 15 cm$^3$. However, other sizes (for example casings of 1000 cm$^3$) could be considered, for example in order to rotate three-way valves 200 in industrial installations. Different types of materials can be used to carry out the device 100 of the invention. Preferably, the outer envelope, such as for example the first 21, second 22 and third 23 casings are made of aluminium. Preferably, the first 11 and second 12 pistons, as well as the pin 5 are made of stainless steel. Preferably, the rotating element 31 of the member for converting 7 which is shown in FIGS. 1 to 3 is made of bronze, preferably self-lubricating.

Preferably, the first 1 and second 2 drives can be supplied with a control fluid in order to control them. To do this, each hydraulic cylinder (1, 2), preferably has a control fluid inlet (61, 63) and a control fluid outlet (62, 64). The control fluid can be sent to the bottom or to the top of the casings (21, 22) in order to impose the movement of the pistons (11, 12).

When the control fluid is compressed air, working pressures are generally between 2 and 10 bar. Preferably, when the control fluid is compressed air, it is supplied to the first 1 and second 2 hydraulic cylinders by the intermediary of a system of valves 200 with compressed air. In order to control the injection of compressed air into the first 1 and second 2 hydraulic cylinders, it is possible for example to use two solenoid valves 200 control by 24 V.

Preferably, ratio of the surfaces of the first 41 and second 42 plates of the first 11 and second 12 pistons is greater than one and more preferably, it is equal to 2. In this latter case, the force that can be exerted by the first piston 11 is then twice as substantial as the force that can be exerted by the second piston 12, for the same pressure of the control fluid.

Figure 5A:
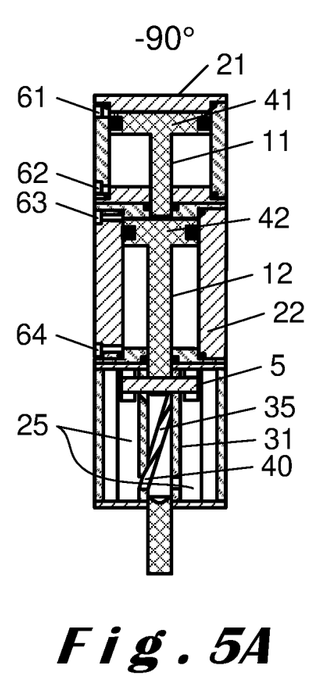
FIG. 5A, 5B, 5C show an operating principle of the device of the invention according to a preferred embodiment.
Figure 5B:
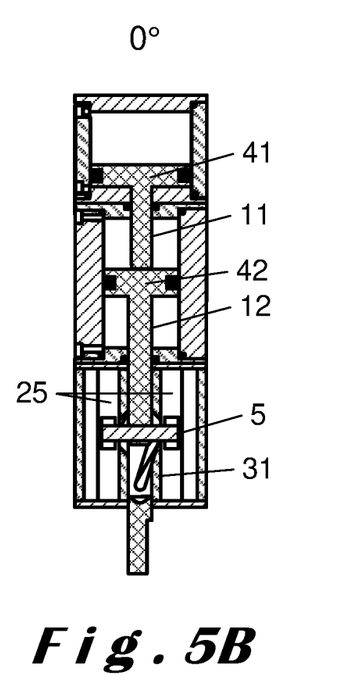
Figure 5C:
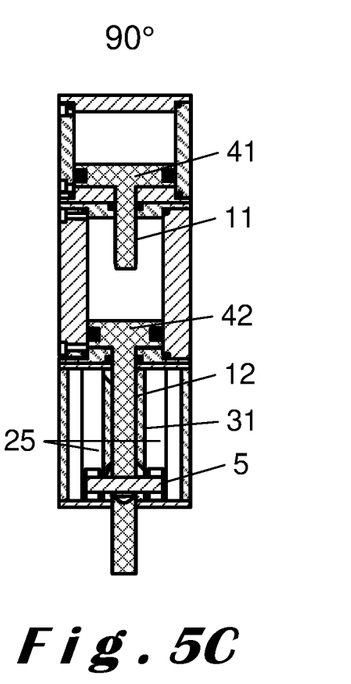
Figure 6A:
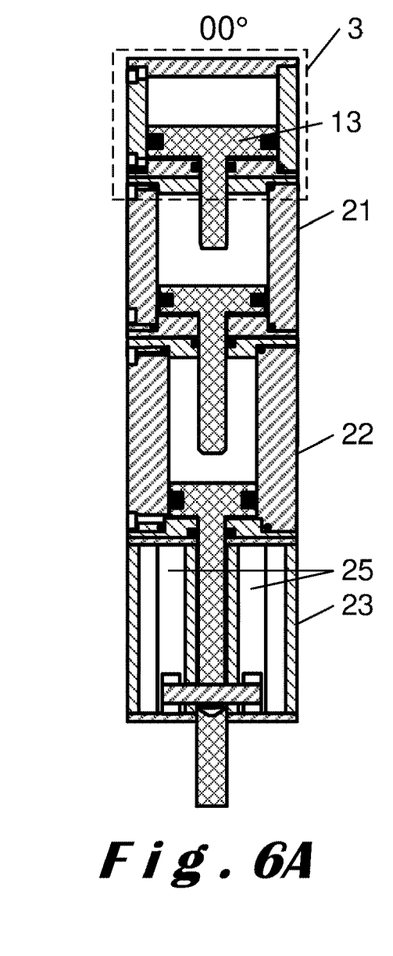
FIG. 6A, 6B, 6C, 6D shows an operating principle of the device of the invention according to another possible embodiment.
Figure 6B:
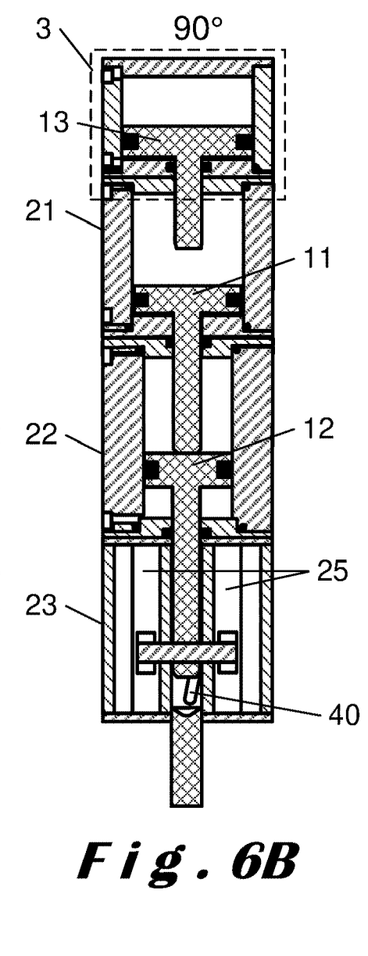
Figure 6C:
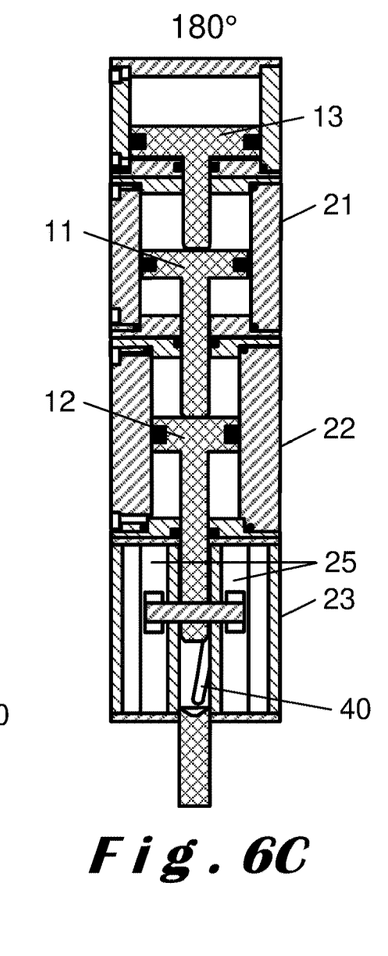
Figure 6D:
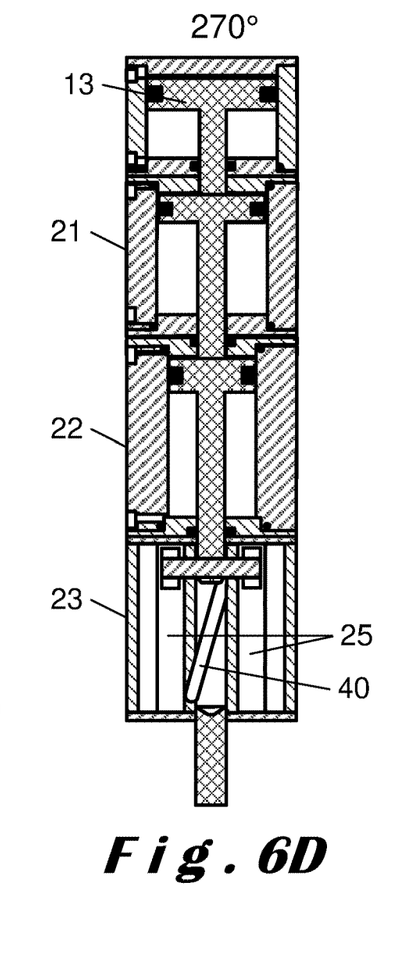

FIG. 5 shows a possible operating principle of the device 100 of the invention. Thanks to the device 100 of the invention, it is possible to impose three different positions on a valve 200 to be controlled, −90°, 0° and +90° for example.

The left portion of FIG. 5 shows a first configuration of the device 100 of the invention, called the position at −90° in what follows. For this position, the first piston 11 is raised as much as possible. The upper surface of the first plate 41 of the first piston 11 is in contact with an upper inner wall of the first casing 21. The second piston 12 is also raised as much as possible for this '−90°' position. The upper surface of the second plate 42 of the second piston 12 is in contact with an upper inner wall of the second casing 22. Finally, the pin 5 is also raised as much as possible. In order to obtain the operating mode shown in the left portion of FIG. 5, the first (respectively second) hydraulic cylinder 1 (respectively 2) is for example supplied with control fluid via a second port 62 (respectively 64).

The central portion of FIG. 5 shows a second configuration of the device 100 of the invention, called position at 0° in what follows. For this position, the first piston 11 is lowered as much as possible. The lower surface of the first plate 41 of the first piston 11 is in contact with a lower inner wall of the first casing 21. The second piston 12 is however pushed upwards by the control fluid but blocked in its progression upwards by the first piston 11. Preferably, the first piston 11 blocks the second piston 12 halfway. There is therefore a balanced position of the second piston 12 that results from an equilibrium between the action of a force upwards exerted by the control fluid on the second plate 42 and a force downwards exerted by the first piston 11. The pin 5 which is integral with the second piston 12 is therefore in an intermediate position, for example halfway if the second piston 12 is blocked halfway. In order to obtain the operating mode shown in the central portion of FIG. 5, the first (respectively second) hydraulic cylinder 1 (respectively 2) is for example supplied with control fluid via a first (respectively second) port 61 (respectively 64).

The right portion of FIG. 5 shows a third configuration of the device 100 of the invention, called position at +90° in what follows. For this position, the first piston 11 is again lowered or pushed to the maximum. The lower surface of the first plate 41 of the first piston 11 is in contact with a lower inner wall of the first casing 21. The second piston 12 is also pushed completely downwards by the control fluid here. The lower surface of the second plate 42 of the second piston 12 is therefore in contact with a lower inner wall of the second casing 22. The pin 5 which is integral with the second piston 12 is therefore pushed into a lower position, at the end of the stroke. In order to obtain the operating mode shown in the right portion of FIG. 5, the first (respectively second) hydraulic cylinder 1 (respectively 2) is for example supplied with control fluid via a first port 61 (respectively 63).

In order to switch the configuration of the device called the position at 90° to the position called position at 0°, the first piston 11 is maintained in lowered position or pushed as far as possible downwards by the control fluid injected via the control fluid input 61. The lower surface of the first plate 41 of the first piston 11 is then in contact with a lower inner wall of the first casing 21. The second piston 12 is then pushed upwards by the control fluid injected via the control fluid input 64. The plate 42 of the second piston 12 is then blocked halfway by the first piston 11. There is therefore a balanced position of the second piston 12 that results from an equilibrium between the action of a force upwards exerted by the control fluid on the second plate 42 and a force downwards exerted by the first piston 11. The pin 5 which is integral with the second piston 12 is therefore in an intermediate position, for example halfway if the second piston 12 is blocked halfway.

In order to switch the configuration of the device called the position at 0° to the position called position at −90°, the first piston 11 is raised or pushed as much as possible upwards by the control fluid injected via the control fluid input 62. The upper surface of the first plate 41 of the first piston 11 is then in contact with an upper internal wall of the first casing 21. The second piston 12 is then pushed upwards by the control fluid injected via the control fluid input 64. The upper surface of the second plate 42 of the second piston 12 is then in contact with an upper internal wall of the second casing 22. The pin 5 is then raised as much as possible and makes it possible to reach the position at −90°.

In order to switch the configuration of the device called position at −90° to the position called position at +90°, the second piston 12 is pushed fully downwards by the control fluid injected via the fluid inlet 63. The lower surface of the second plate 42 of the second piston 12 is therefore in contact with a lower inner wall of the second casing 22. The pin 5 which is integral with the second piston 12 is therefore pushed into a lower position, at the end of the stroke and makes it possible to reach the position at +90°. The first piston 11 is not necessarily lowered or pushed as much as possible. The lower surface of the first plate 41 of the first piston 11 is not necessarily in contact with a lower inner wall of the first casing 21 in order to reach the position at +90°.

In order to switch the configuration of the device called position at +90° to the position called position at −90°, the first piston 11 is raised or pushed as much as possible upwards, if this has not already been done, by the control fluid injected via the control fluid input 62. The upper surface of the first plate 41 of the first piston 11 is then in contact with an upper internal wall of the first casing 21. The second piston 12 is then pushed upwards by the control fluid injected via the control fluid input 64. The upper surface of the second plate 42 of the second piston 12 is then in contact with an upper internal wall of the second casing 22. The pin 5 is then raised as much as possible and makes it possible to reach the position at −90°. In order to reach the position at −90° starting from the position at +90°, it is preferable to actuate the first piston 11 before the second piston 12 pushes the first piston 11 upwards. As such it is possible to reach the position at −90° starting from the position at +90° in a single continuous movement thanks to the prior raising of the first piston 11 into the top position and to the raising of the second piston 12 corresponding to its complete stroke.

Angular positions other than those mentioned in FIG. 5 could be considered for the three configurations of the device 100 of the invention.

In the first hydraulic cylinder 1, the first plate 41 of the first piston 11 delimits a first and a second chamber in the first casing 21. The first chamber is able to be supplied with compressed air via the control fluid input 61. The second chamber is able to be supplied with compressed air the control fluid input 62. In the second hydraulic cylinder 2, the second plate 42 of the second piston 12 delimits a third and a fourth chamber in the second casing 22. The third chamber is able to be supplied with compressed air via the control fluid input 63. The fourth chamber is able to be supplied with compressed air via the control fluid input 64. The first, second, third and fourth chambers are all different and do not allow for communication of the control fluid from one chamber to another.

The device 100 of the invention can include more than two linear hydraulic cylinders. In particular, the device 100 of the invention can include a third linear hydraulic cylinder 3 coupled for example to the first hydraulic cylinder 1. FIG. 6 shows an example of a device 100 comprising three linear hydraulic cylinders, a third linear hydraulic cylinder 3 comprising a third piston 13. By using more than two linear hydraulic cylinders, it is possible to have a device 100 with more than three configurations or different positions. For example, by using three linear hydraulic cylinders, it is possible to have a device 100 with four positions or different configurations. In the case shown in FIG. 6, the following positions can be obtained: 0°, 90°, 180° and 270°. Generally, with the device 100 of the invention, a hydraulic cylinder 1 can limit (or not) the stroke of another hydraulic cylinder 2, which itself can limit (or not) the stroke of another hydraulic cylinder 3, which can limit (or not) etc.

Figure 7:
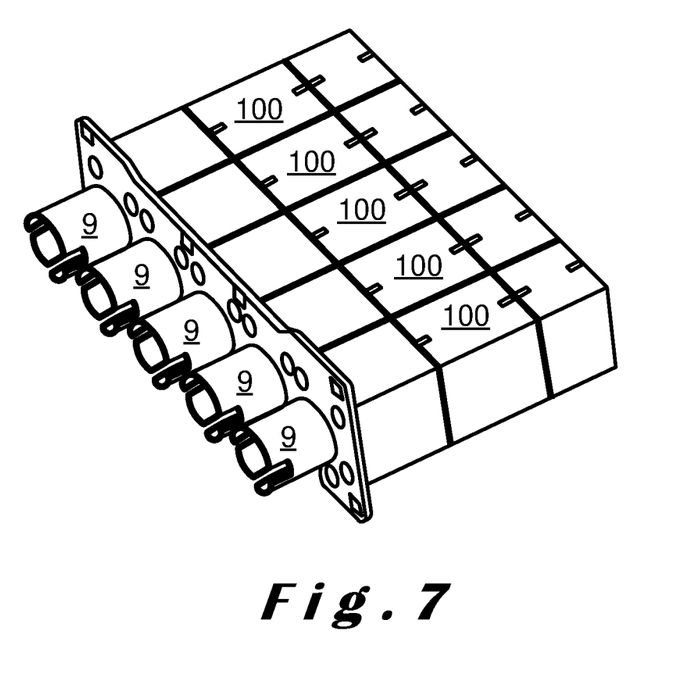
FIG. 7 shows an assembly of five devices according to the invention.

FIG. 7 shows another proposition of the inventors: an assembly of five devices 100 such as described hereinabove. As can be seen in this figure, each device 100 is preferably connected to a connecting element 9. The various devices 100 are preferably place in parallel and each coupled to a valve 200 to be controlled for example.

Figure 8:
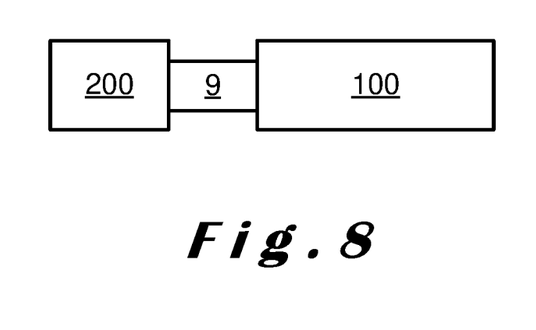
FIG. 8 shows an assembly of a device according to the invention and of a connecting element fitted onto a valve to be controlled.

FIG. 8 shows an assembly of a device 100, of a connecting element 9 fitted onto a valve 200 to be controlled.

The inventors also propose a system for controlling a passage of a fluid in a duet and comprising at least one valve 200 for controlling the passage of said fluid in the duct and at least one device 100 such as described hereinabove, with each device 100 being coupled to a valve 200 to be controlled. Taking the assembly shown in FIG. 7, it is for example possible to design a system for controlling five valves 200. When each device 100 comprises two hydraulic cylinders (1, 2), three positions of each valve 200 are then possible.

The inventors finally propose a machine for synthesising or purifying elements (for example radioactive element) that comprises a system such as described in the preceding paragraph, a control unit in order to control the device or devices of said system and a duct, in such a way that the valve 200 or valves 200 to be controlled are located in said duct. The various valves 200 define different sections of the duct. With such a machine, each valve 200 can then be controlled individually and can carry out rotations in both directions without having to stop in the intermediate position. A fluid contained in a reservoir can be pressurised in order to enter into said duct via a valve 200 controlled by a device 100 such as described hereinabove, with said valve 200 controlling the passage of said fluid in a section of the duct. According to the respective positions of each one of the valves 200 of the machine for synthesising which are controlled by the device of the invention, said fluid will be directed from one section to another of the duct by passing or not through elements arranged to treat said fluid. As said valves 200 can be driven according to rotations in both directions, said fluid can therefore pass from a first section to a second section then pass back to said first section if necessary.

This invention was described in relation with specific embodiments, which have a purely illustrative value and must not be considered as limiting. Generally, this invention is not limited to the examples shown and/or described hereinabove. The usage of the verbs "include", "contain", "comprise", or any other alternative, as well as the conjugations thereof, cannot in any way exclude the presence of elements other than those mentioned. Usage of the indefinite article "a", "an, or of the definite article "the", in order to introduce an element does not exclude the presence of a plurality of these elements. The reference numbers in the claims do not limit their scope.

In summary, the invention can also be described as follows. Device 100 for imparting a rotary movement (for example for controlling one or several valves 200), comprising in a longitudinal direction a first 1 and a second 2 driver, characterised in that: said first driver 1 is a linear hydraulic cylinder comprising a first piston 11; in that said second driver 2 is a linear hydraulic cylinder comprising a second piston 12; and in that said device 100 further comprises a member for converting 7 linear motion into rotary motion in order to convert a translation movement of the second piston 12 into a rotary movement.

The invention claimed is:

1. A device for imparting a rotary movement about a longitudinal direction for valve control, the device comprising:
   a first linear hydraulic cylinder comprising a first casing and a first piston, wherein the first piston is configured to provide a translation movement along a longitudinal direction within said first casing, said first hydraulic cylinder configured to be supplied by a control fluid;
   a second linear hydraulic cylinder comprising a second casing and a second piston, wherein the second piston is configured to provide a translation movement along the longitudinal direction within said second casing, said second hydraulic cylinder configured to be supplied by the control fluid;
   a member comprising a third casing configured to convert linear motion into rotary motion in order to thereby convert a translation movement of the second piston along said longitudinal direction into a rotary movement about said longitudinal direction;
   wherein said first and second hydraulic cylinders are configured such that the first hydraulic cylinder is enabled to influence an operating state of the second hydraulic cylinder;
   said first piston comprising a first plate configured to define a first chamber and a second chamber in said first casing;
   said first hydraulic cylinder comprising a first port that is configured to supply said first chamber with said control fluid, and a second port that is configured to supply said second chamber with said control fluid, in order to respectively supply said first chamber and second chamber with said control fluid and impose a translation movement of said first piston in response to a difference in pressure between said first and second chambers;
   said second piston comprising a second plate configured to define a third chamber and a fourth chamber in said second casing and a pin extending in a direction that is substantially perpendicular to said longitudinal direction;
   said second hydraulic cylinder comprising a third port that is configured to supply said third chamber with said control fluid, and a fourth port that is configured to supply said fourth chamber with said control fluid and thereby impose a translation movement of said second piston in response to a difference in pressure between said third and fourth chambers;
   said member comprising a rotating element that is separate from the second piston and is configured to convert a translation movement of the second piston into a rotary movement;
   said rotating element being located in said third casing and outside of the first casing and the second casing and comprising at least one hollow portion comprising a cavity, and comprising over at least one portion of an external surface two helical grooves along said longitudinal direction;
   said second piston configured to penetrate in said cavity of said hollow portion of said rotating element;
   said pin configured for insertion into said two grooves of said rotating element and to thereby mechanically couple said second piston to said rotating element; and
   said third casing comprising a linear internal groove configured to cause said pin to slide along the third housing when the pin provides translational movement relative to the third casing.

2. The device of claim 1, further comprising:
   a rotating connecting element configured to fit onto a valve to be controlled, said connecting element being mechanically coupled to an element of said member for converting.

3. The device of claim 1, configured to impose on an output shaft at least three different angular positions separated by 90° from one another.

4. The device of claim 1, wherein said first hydraulic cylinder is configured to generate a first stroke; said
   second hydraulic cylinder is configured to generate a second stroke that is twice as large as said first stroke generated by the first hydraulic cylinder.

5. The device of claim 1, wherein said first plate has a first surface area that is greater than a second surface area of said second plate.

6. The device of claim 5, wherein said first plate first surface area is twice greater than said second surface area of said second plate.

7. The device of claim 1, further comprising:
   a third linear hydraulic cylinder that is coupled to at least one of the first hydraulic cylinder and the second hydraulic cylinder wherein said third hydraulic cylinder is thereby enabled to influence a configuration of at least one of the first hydraulic cylinder and the second hydraulic cylinder.

8. The device of claim 7, wherein the device is configured to impose on an output shaft at least four different angular positions separated by 90° from one another.

9. The device of claim 1 wherein said linear internal groove can prevent rotation of the pin during its translation.

\* \* \* \* \*